Aug. 7, 1956  W. BAIER ET AL  2,757,662
LIQUID-FUEL OPERATED HEATING DEVICE FOR VEHICLES
Filed July 5, 1951
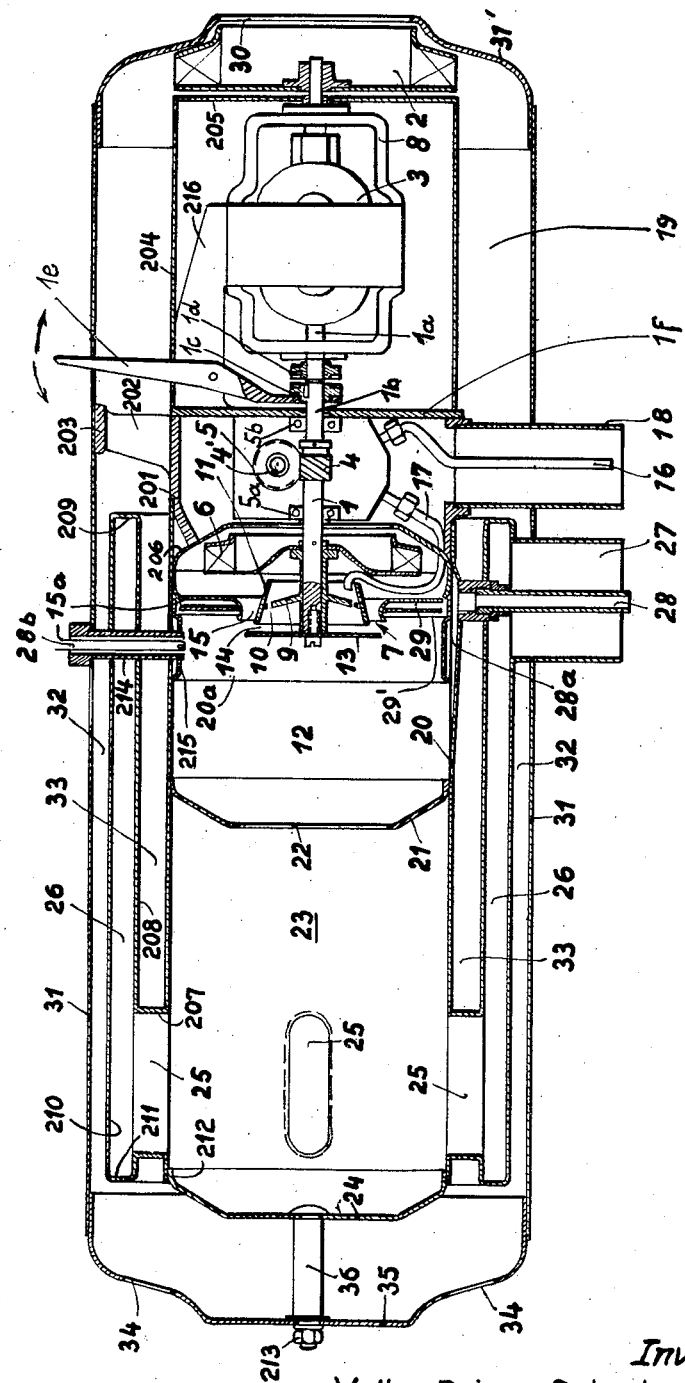
Inventors
Walter Baier + Robert v. Linde
by *HCBierman*
Atty

United States Patent Office 2,757,662
Patented Aug. 7, 1956

2,757,662

LIQUID-FUEL OPERATED HEATING DEVICE FOR VEHICLES

Walter Baier, Stockdorf, near Munich, and Robert von Linde, Planegg, near Munich, Germany, assignors to Wilhelm Baier K. G., Stockdorf, near Munich, Germany, a firm Application July 5, 1951, Serial No. 235,174

3 Claims. (Cl. 126—110)

The invention concerns a liquid fuel operated heating device, having a flowing heating medium, for the heating of vehicles, especially automobiles, and having separate conduits for the combustion air and the heating medium.

Such a heating device should, so far as possible, be adapted not only for a driven vehicle, i. e. one occupied by a driver, but also for trailers in which no personnel is available for controlling the heating device. Even in the driven vehicle the service should be as simple as possible, so as to avoid the driver being distracted from his proper duties by the service of the device. It is therefore an object of the invention to provide a heating device which can be serviced in a simple manner requiring little attention.

The invention is further directed to a heating device in which the supplies of fuel and air of combustion are correctly adjusted to each other, according to the various conditions, especially those determined by the outside temperature. It is also an object of the invention to provide a heating device in which the impellor for the heating medium can be disconnected from the fuel-feed supply device, and from the impellor for air of combustion, as well as from the fuel-vaporising device, so that the heating device can be used as a heater in winter, whilst being usable as a ventilating plant in summer.

The invention is further concerned with a compact arrangement of such a device for the heating of vehicles. A further object of the invention is a heating device in which the vaporisation of the fuel is effected in a simple manner and without difficulties. Finally the invention is also directed to operating such a heating device for vehicles either with air or with water as the heating medium.

These and other objects of the invention are achieved by so arranging a heating device operated with liquid fuel, preferably oil and having a flowing heating medium for the heating of vehicles, preferably automobiles, with separate conduits for the combustion air and the heating medium that the means for conveying fuel and combustion air are so constructed that both are conveyed with a constant ratio of fuel to combustion air independently of the amounts conveyed. The combustion air is preferably conveyed by means of a rotary blower, and the fuel by a volumetrically conveying pump, for example a positive displacement pump, reciprocating pump, geared pump, metering pump or rotary piston pump and both the conveying means are driven with a constant ratio of rotary speeds. The whole of the fuel conveyed is preferably fed to the combustion. The rotary blower and the displacement pump are advantageously driven by a common motor, the speed of rotation of which is preferably capable of regulation. The rotary conveying device for the heating medium can also be driven by this motor and the conveying devices for the combustion air and the heating medium can advantageously be mounted on a common shaft, which, may be the motor-shaft. A driving means for the fuel conveying device can also be arranged on this common shaft, the combustion chamber and the heat exchanger being arranged coaxially to this shaft and within a casing.

It is desirable so to arrange the sequence of these rotary conveying devices that the conveying device for the heating medium is first mounted on the common shaft, then the driving means for the fuel-conveying device, and finally the rotary blower for the combustion air, the combustion chamber being disposed in a continuation of this series and the fuel conveying means being preferably arranged in the suction chamber of the combustion air. The driving motor for these rotary conveying devices is also advantageously mounted on this common shaft preferably between the rotary conveying device for the heating medium and the driving means for the combustion air conveyor, the common shaft having bearings on both sides of the motor. It is particularly advantageous to employ a centrifugal atomiser for atomising the fuel in the centrally disposed inlet to the combustion chamber on the common shaft. The heating medium is advantageously led from a central inlet through a jacket chamber surrounding the suction chamber of the combustion air and around the combustion chamber to the outlet.

It is especially advantageous to construct the common shaft for the conveying device for the heating medium, the driving motor, the fuel conveying pump, the combustion air conveyor and the atomiser separately, so that the conveying device for the heating medium and the driving motor can be uncoupled from the other apparatuses located on the common shaft. In this way, these other apparatuses stop and the heat device can serve as a ventilating plant.

As driving motor, an electric motor is used with advantage, preferably a series wound motor or a shunt wound motor.

If air is used as the heating medium, then it is preferably conducted in the same direction to the combustion flame, whilst if liquid is used, for example water as the heating medium, this is allowed to flow in counter current to the combustion flame. The circulation of the heating fluid is preferably forced. If air is used as the heating medium, the air blower can be disposed in front of the suction chamber for the combustion air and the diameter of the blower can correspond approximately to the diameter of the combustion chamber. If a liquid, preferably water, is used as the heating medium, the means for conveying the fuel and for circulating the liquid as well as the combustion air blower can be so constructed that the fuel feed and liquid circulation are effected independently of the quantities fed in the same ratio, and the combustion takes place with the same excess of air. Advantageously liquid and fuel are fed by a volumertic feeding pump whose speed ratio is constant. It is especially advantageous to construct such a heating device for the use of water with a two or multi stage switch which when a predetermined water temperature is reached automatically, e. g. thermostatically, switches over to a continuous operation which is considerably below full output, or switches off entirely.

Various embodiments by way of example of the invention are shown in the drawings for clarification and without limitation, and these show:

The single figure is an axial cross-sectional view of a heater made in accordance with the present invention.

Referring now to the drawing in greater detail, it will be seen that the heater comprises an outer cylindrical sheet metal casing 31 with end covers 31' and 35 airtightly telescoped in the opposite end portions of the casing 31 and secured in position by screws (not shown). Mounted therein is an inner casing comprising a substantially cylindrical portion 201 of cast steel or the like which is secured within the outer casing 31 by flanged ribs 202 and screws (not shown) extending through the wall of casing 31 into the flanges 203 of ribs 202. A further cylindrical casing portion 204 with detachable end wall 205 is detachably secured to an end wall 1f of member 201 whereas on the opposite side of member 201 a cylindrical sheet metal casing portion or partition wall 20 is detachably secured to member 201, said partition wall 20 being formed integral with an end flange 207 and a cylindrical sheet metal shell member 208 which, again through an end flange 209, is connected to a similar cylindrical partition wall 210 whose end wall 211 is bent as shown. Wall 20 is closed by an intermediate cover 24 detachably secured to the axial flange 212 of the wall 20, as by screws (not shown). The intermediate cover 24 is connected with the outer cover 35 by a central stud bolt 36 which may be riveted to cover 24 and secured to cover 35 by a nut 213 and washers, as shown. A frustro conical disc 21 is secured within the shell 20, as by screws (not shown). The space defined by the partition walls 20, 21 and 24 constitutes the afterburning chamber 23 in the length of which the wall 20 has four openings 25 spaced by 90° from each other, so as to form a connection to the duct 26.

A small tube 214 extends radially through the members 31, 208, 210, and 20, being airtightly connected thereto, said tube 214 enclosing an ignitor wire 28b which is coiled at its lower end, for igniting the atomized fuel and air mixture as will be hereinafter described. Also mounted in the casing portion 20 and connected to member 201 is a casing member 206 having a separate end wall 29 which forms an annular nozzle 15 together with a frustro conical disc 11 and has secured to it a flat disk 29' for thermal insulation, the space between the walls 29 and 29' being filled up by a refractory or heat insulating material, such as, asbestos (not shown) which is also inserted in the annular space between the casing portion 20 and a ring 215 of U-shaped cross section, so as to form a combustion chamber. Mounted within the casing 204, by an arm 216 secured to the wall 1f by screws (not shown) is a motor 8 whose shaft 1a is driven by the armature 3 and extends through a central bore of the wall 205 for driving an impeller 2 which is overhung thereon and sucks in fresh air as will be hereinafter described. Mounted on the opposite end of shaft 1a is a coupling half 1d whose complementary member 1c is mounted on a shaft 1b which is mounted for rotation in bearings 5a and 5b of a fuel pump 5 and carries a worm 4 meshing with a form wheel 4' of the pump 5 so as to drive said pump and suck oil or other fuel from a feed pipe 16 through the pump and a feed pipe 17 onto a rotary frustro conical boss 9 also mounted on the shaft 1 and provided at its outer part with apertures 10 for the passage of the fuel. The boss 9 is rigidly connected with the above mentioned frustro conical jacket 11 and with a heat receiving disc 13 in front of atomizer cone 9, so as to leave open a gap 14 between jacket 11 and disc 13 for the passage of the fuel atomized by centrifugal force. Moreover, an impeller 6 is mounted on the shaft 1 for sucking air from a branch 18 through the casing 201 and feeding it through casing 206 and the above mentioned annular nozzles 15 into the combustion chamber, together with the atomized fuel as will be hereinafter described. By means of a lever 1e the coupling halves 1c and 1d can be engaged with, or disengaged from, each other for the purpose which will be hereinafter described.

The casing portion or partition wall 20 is formed at its lowest point with an outward depression 28a forming a sump for collection of any excess amounts of oil possibly not burnt and dripping down. A drain pipe 28 extending through the walls 20, 208, 210, and 31 and being tightly connected thereto by sleeves serves to remove such excess oil, said pipe 28 being surrounded by a substantially larger branch 27 forming the exhaust pipe for the exhaust gases as will be hereinafter described.

All of the said parts and elements can be assembled in a very simple manner by insertion into the outer casing 31 in an axial direction, from the right hand end thereof.

The heating device shown in the figure operates as follows:

The heating air is sucked through the opening 30, by the impeller 2, and fed through the opening 30 into the annular space 19 between the outer jacket 31 and the partition wall 204, and through the annular ducts 32 and 33, and emerges through several openings 34 in the end cap 35.

The air for combustion is sucked through the branch 18, passes around the fuel pump 5 and is forced by the impeller 6 through the annular nozzle 15.

The fuel is sucked by the fuel pump 5 through pipe 16 and forced through a pipe 17 against the boss 9 and through the apertures 10 and the annular gap 14. The fuel which is sprayed by the rotating atomiser is partly taken up by the air from nozzle 15, while the other part is flung onto a part 20a of the outer jacket where it evaporates and mixes with the air which passes out at the exit 15a, for combustion in the main combustion chamber 12. The flame gases enter through the opening 22 of partition wall 21 into the afterburning chamber 23, and pass out through the apertures 25, the annular duct 26 and the branch 27, transmitting their heat to the heating air passing through the ducts 32 and 33, by thermal conduction through the partition walls 20, 207, 208, 209, 210, 211 and 24.

Any fuel not being burnt will be collected in the sump 28a and returned to the fuel reservoir (not shown) through the pipe 28 extending through the walls 20, 208, and 210 and through the branch 27.

In order to start operation of the heater device, it is merely necessary to switch on the motor 8 and, for a short instant, to connect the igniter coil or sparking plug 28b to a suitable source of current (not shown). The heat output can be controlled by altering the speed of the motor 8. The heating device will always operate at optimum conditions since the ratio of fuel, combustion air and heating air remains unchanged by regulation of the motor speed.

Normally, the handle of lever 1e will be shifted to the left hand side in order to engage the coupling members 1c and 1d with each other. However, where it is intended to use the device for the purpose of ventilation, without heating, the handle may be shifted to the right for disconnecting the coupling 1c, 1d.

On principle, the device shown in the figure could be operated also with water as a heating medium, provided that the outlets 34 are connected to radiator pipes installed in the vehicle, which radiator pipes lead to the inlet 30, to permit circulation of the water through the vehicle.

For controlling the motor 3, a two or three stage switch may be used which if desired can be automatically operated by a thermostat or similar device which is not shown. The rating of the water circulating pump corresponding to the impellor 2 is preferably so selected that at full output of the water heater according to the invention a temperature increase of from 5 to 15° is obtained.

The new heating device can also be used for other purposes, for example for camps and barracks.

What we claim is:

1. A heating device comprising an elongated, substantially cylindrical casing having a central longitudinal axis, a co-axial cylindrical wall within said casing and spaced therefrom to form a heat-exchanger chamber therebetween, a transverse member forming with said cylindrical wall a central main combustion chamber within said cylindrical wall and an after combustion chamber at one end of said casing within said cylindrical wall and communicating with said main chamber, means for feeding fuel and combustion air into said main chamber at the other end of said casing within said cylindrical wall, an opening at said other end of said casing for introducing heating fluid into and thru said heat-exchanger chamber and an opening at said one end for exit of said fluid, an annular duct extending rearwardly from said one end to a point adjacent the fuel and air feeding means for said main combustion chamber, said duct surrounding said cylindrical wall in spaced relation thereto and spaced inwardly of said casing, a connection from said afterchamber to said duct at said one end of said casing, said heating fluid adapted to pass in contact with the inner and outer faces of said duct, and an outflow connection for combustion gases from said duct at a point adjacent the rear end thereof, an axial shaft at said other end rearwardly of said main chamber, an impeller for heating fluid operatively associated with said opening at the other end of said casing, said impeller being attached to the rear end of said shaft, a second impeller operatively associated with said means for feeding combustion air and attached to said shaft adjacent the front end thereof, a motor within said cylindrical wall and between said impellers in driving relation to said shaft, an atomizer attached to the front end of said shaft including an atomizer cone in fuel receiving relation to said fuel supply means and a disc vertically of said shaft and spaced forwardly of said cone, said disc forming a part of said main combustion chamber opposite said transverse member whereby said disc is adapted to reflect the heat from said combustion chamber and thereby protect the liquid fuel in said atomizer, and a pump on said shaft connected to feed liquid fuel to said fuel supply means.

2. A heating device according to claim 1 in which there is an inner casing surrounding said motor so that said heating fluid contacts said inner casing.

3. A heating device according to claim 1 in which said motor is mounted for rotation in a motor housing, an end wall between said housing and said second impeller for combustion air, a second end wall between said housing and said first impeller for heating fluid, the ends of said housing being mounted on said end walls.

References Cited in the file of this patent

UNITED STATES PATENTS

| | | |
|---|---|---|
| 1,193,819 | Ray | Aug. 8, 1916 |
| 1,699,623 | Novak | Jan. 22, 1929 |
| 2,096,859 | Rayfield | Oct. 26, 1937 |
| 2,108,918 | Falkenberg | Feb. 22, 1938 |
| 2,286,853 | Holthouse | June 16, 1942 |
| 2,308,888 | McCollum | Jan. 19, 1943 |
| 2,314,089 | Hess et al. | Mar. 16, 1943 |
| 2,373,759 | Hourvitz | Apr. 17, 1945 |
| 2,384,468 | Holthouse | Sept. 11, 1945 |
| 2,484,385 | McCollum | Oct. 11, 1949 |
| 2,503,261 | Hall | Apr. 11, 1950 |

FOREIGN PATENTS

| | | |
|---|---|---|
| 616,006 | Great Britain | Jan. 14, 1949 |